April 15, 1969 LE ROY F. GRANTHAM 3,438,728
TWO-STAGE REGENERATION OF ABSORBENT FOR SULFUR OXIDES
Filed May 15, 1967
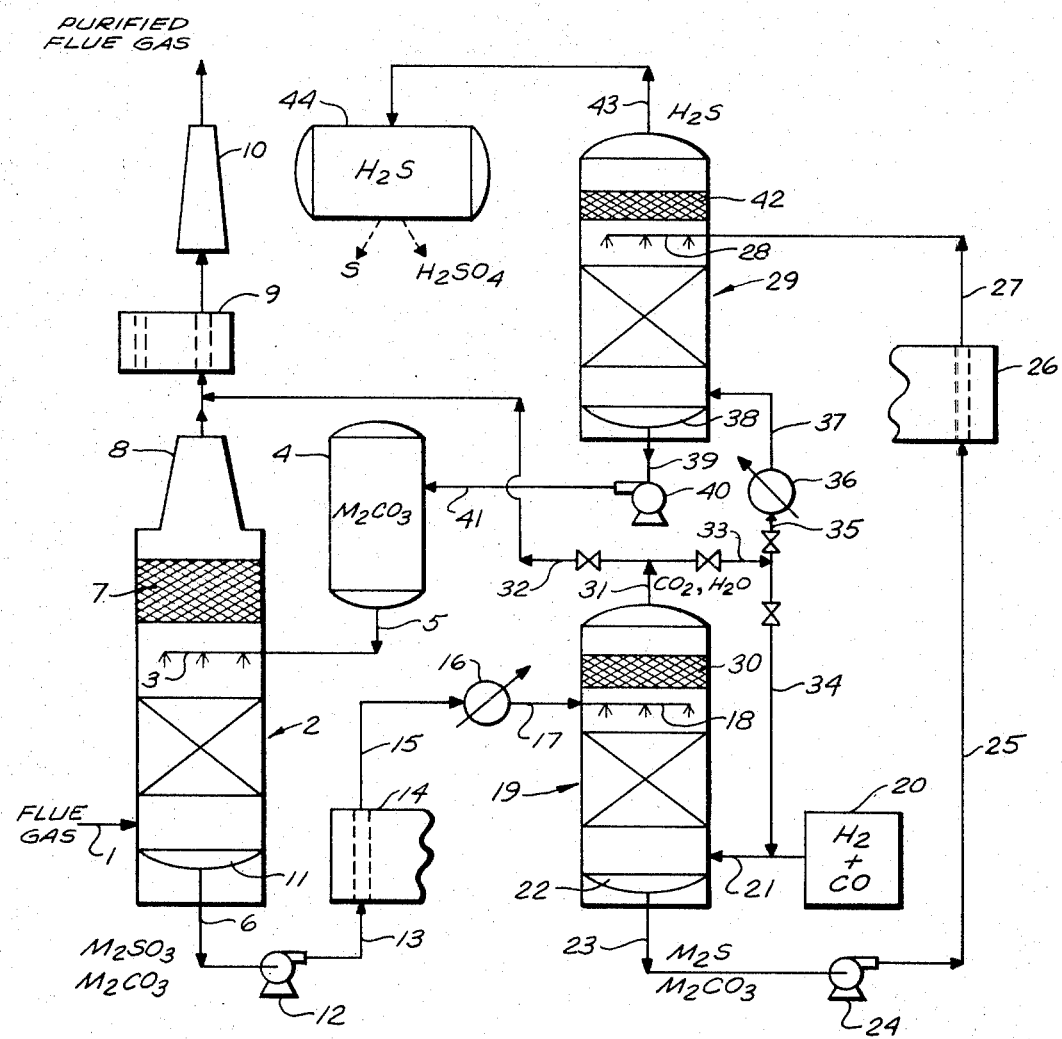
INVENTOR.
Le ROY F. GRANTHAM
BY Henry Kolin
ATTORNEY

United States Patent Office 3,438,728
Patented Apr. 15, 1969

3,438,728
TWO-STAGE REGENERATION OF ABSORBENT FOR SULFUR OXIDES
Le Roy F. Grantham, Calabasas, Calif., assignor to North American Rockwell Corporation
Filed May 15, 1967, Ser. No. 638,529
Int. Cl. C01b 17/16
U.S. Cl. 23—181     8 Claims

ABSTRACT OF THE DISCLOSURE

A method for removing sulfur dioxide from flue gas by (1) absorption of the sulfur dioxide in a molten salt mixture containing alkali metal carbonate to form alkali metal sulfite, (2) reduction of the alkali metal sulfite by treatment with hydrogen, carbon monoxide, or a mixture thereof to form alkali metal sulfide, and (3) treatment of the alkali metal sulfide with a gaseous mixture containing steam and carbon dioxide to form hydrogen sulfide and regenerate the alkali metal carbonate absorbent.

CROSS REFERENCES TO RELATED APPLICATIONS

The method for removing sulfur dioxide from flue gas by absorption of the sulfur dioxide in a molten alkali metal carbonate mixture to provide the feedstock for the two-stage regeneration process of the present invention is described in patent application S.N. 638,528, filed May 15, 1967 and assigned to the assignee of the present invention.

Other regeneration processes that may also be utilized for treatment of the resultant absorbent solution provided by the process described in S.N. 638,528 are described in the following patent applications, all filed May 15, 1967 and assigned to the assignee of the present invention: "Absorbent Regeneration Using Carbon Regenerant," S.N. 638,365, "Sulfur Production Using Carbon Oxide Regenerant," S.N. 638,530, "Sulfur Production Using Carbon Regenerant," S.N. 638,366 and "Electrochemical Method for Recovery of Sulfur Oxides," S.N. 638,364.

BACKGROUND OF THE INVENTION

This invention relates to a process for the removal of sulfur compounds from hot combustion gases. It particularly relates to a process wherein the sulfur dioxide content of a flue gas is removed by absorption in a molten alkali metal carbonate-containing solution, and the absorbent is regenerated by a two-stage regeneration process comprising the sequential steps of reduction and reformation, and the sulfur values recovered from the resultant absorbent solution.

Sulfur oxides, principally as sulfur dioxide, are present in the waste gases discharged from many metal refining and chemical plants and in the flue gases from power plants generating electricity by the combustion of fossil fuels. The control of air pollution resulting from this discharge of sulfur oxides into the atmosphere has become increasingly urgent. An additional incentive for the removal of sulfur oxides from waste gases is the recovery of sulfur values otherwise lost by discharge to the atmosphere. However, particularly with respect to the flue gases from power plants, which based on the combustion of an average coal may contain as much as 3000 p.p.m. sulfur dioxide and 30 p.p.m. sulfur trioxide by volume, the large volumes of these flue gases relative to the quantity of sulfur which they contain make removal of the sulfur compounds from these gases expensive. Also, while the possible byproducts, such as elemental sulfur and sulfuric acid, that may be ultimately obtained from the recoverable sulfur values have virtually unlimited markets as basic raw materials, they sell for relatively low figures. Consequently, low-cost recovery processes are required.

Many processes have been proposed and investigated for the desulfurization of flue gases. In a typical wet absorption process, the flue gas is washed with an alkaline aqueous solution or slurry. Thus the use of an aqueous slurry of calcium hydroxide or calcium carbonate has been investigated in several British power plants. In other wet processes, aqueous ammonia or aqueous sodium sulfite solutions have been utilized as washing fluids. While these wet processes have some advantageous features, they all suffer from the common drawback of the flue gas being cooled substantially and becoming saturated with water vapor in the absorption tower. This cooling of the gas decreases the overall efficiency of the process because of the additional power requirements for dispersal of the flue gas to the atmosphere. Further, the associated condensation and precipitation of evaporated water containing contaminants in the surrounding environment creates substantial problems.

In the dry processes using solid adsorbents, sulfur dioxide is removed either by chemical reaction with the adsorbent or by adsorption followed by oxidation of the adsorbed sulfur dioxide. In one such process shown in U.S. Patent 2,718,453, finely powdered calcium carbonate is blown into the combustion gas to form calcium sulfate or calcium sulfite. In general a reaction between a solid and gas is relatively slow and inefficient, being limited to the available surface area of the solid. Also, the resultant products do not readily lend themselves to regeneration of the starting carbonate material or recovery of the removed sulfur values.

In a regenerative dry process, the flue gas is contacted with activated lignite char at about 200° C., sulfur dioxide being adsorbed and converted immediately by the oxygen and water present in the flue gas to sulfuric acid. The char is regenerated by heating at about 400° C. to yield a desorbed gas of high sulfur dioxide content. In another dry process, pellets of alkalized alumina are used as adsorbent to remove sulfur dioxide. Undesirably, this adsorbed material is oxidized to sodium sulfate by the catalytic action of the alkalized alumina. The saturated adsorbent is regenerated by heating it at 600° C. with a reducing gas. The solid adsorbent processes are disadvantageous in being surface area limited and further because of the difficulties involved in the handling and moving of large quantities of the solid adsorbent which would be required in large-scale process applications.

In a catalytic oxidation process, sulfur dioxide is converted to sulfur trioxide at a temperature of about 400–430° C. by catalytic oxidation using alumina-supported platinum or vanadia catalysts, followed by hydration to sulfuric acid. While the concept of direct oxidation is potentially attractive, very extensive prior purification of the flue gas is required to avoid posioning of the catalyst and contamination of the produced sulfuric acid. Also, the resultant 70 weight percent sulfuric acid produced in such a process is very corrosive at the condensation temperature involved, and therefore requires the use of very large and expensive corrosion-resistant equipment. Further, sulfuric acid of this concentration has a very limited market.

SUMMARY OF THE INVENTION

It is an object of the present invention to provide a highly efficient method for the removal of sulfur dioxide and sulfur trioxide from flue gases using inexpensive, readily available materials and avoiding the use of expensive equipment. In addition to the absorption stage, the process includes two-stage regeneration for regenerating the absorbent and recovering sulfur values readily convertible to sulfur or sulfuric acid as marketable products.

In accordance with this invention, a sulfur removal process is provided comprising the separate sequential steps of absorption, reduction, and reformation. The two sequential steps of reduction and reformation are designated as a two-stage regeneration of the sulfur-containing absorbent solution resulting from the absorption stage, in distinction to the single-stage regeneration describe in copending application S.N. 638,528.

In the absorption stage, sulfur oxides present in a hot combustion gas generally produced by burning a sulfur-containing hydrocarbon or fossil fuel are removed from the combustion gas by contacting the gas at a temperature of at least 350° C. with a molten salt mixture containing alkali metal carbonates as active absorbent to thereby remove the sulfur oxides. The melting temperature of the salt mixture is preferably between 350 and 450° C. The resultant sulfur compound that is formed consists principally of alkali metal sulfite, derived from the sulfur dioxide, and may also contain alkali metal sulfate, derived from the $SO_3$ present.

For the two-stage regeneration, in the first step of reduction the resultant molten absorbent solution containing the absorbed sulfur values, principally as alkali metal sulfite, is treated at a temperature of at least 400° C. under reaction conditions favoring formation of sulfide, with a reductant gas mixture containing as principal active reducing agent hydrogen, carbon monoxide, or a mixture thereof to convert the absorbed sulfur values principally to alkali metal sulfide in the molten salt. In the second step of reformation the alkali metal sulfide-containing molten salt is treated with a gaseous mixture containing steam and carbon dioxide, at a temperature below 450° C. at which the salt is molten, to reform or regenerate the alkali metal carbonate and convert the alkali metal sulfide to hydrogen sulfide gas. This hydrogen sulfide gas is a suitable feedstock for ready conversion to sulfur or sulfuric acid.

In considering the specific and preferred features characterizing the three steps of the process of the present invention and particularly the two-stage regeneration, the molten product of reaction obtained from the absorption stage consists of alkali metal sulfite dissolved in molten alkali metal carbonate and optionally contains a fused salt diluent. For the two-stage regeneration, the foregoing molten product of reaction is first treated in the reduction step at a temperature between 400 and 700° C., preferably between 600 and 650° C., under reducing conditions with a reductant gas mixture which contains as principal active reducing agent hydrogen, carbon monoxide, or a mixture thereof such as producer gas or water gas, according to the following equations:

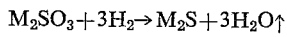
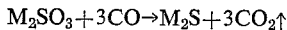
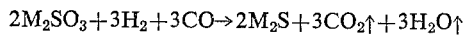

Thermodynamically, as well as kinetically, higher temperatures favor the formation of sulfide, which is also favored by continuous and rapid removal of the formed gases from the reaction zone. The molten product of the reduction reaction consisting principally of $M_2S$ in excess $M_2CO_3$ is separated from the evolved gases containing carbon dioxide and steam. The $M_2CO_3$ is then reformed or regenerated by treatement of the sulfide-containing molten salt with at least a portion of the resultant gaseous mixture of carbon dioxide and steam at a temperature between 325 and 450° C. at which the salt is molten, preferably between 400 and 425° C., according to the following equation:

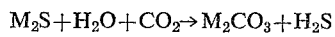

Where required, supplemental amounts of $H_2O$ or $CO_2$ may be fed to the reformer unit. Lower temperatures favor the reformation reaction. The resultant molten mixture of the alkali metal carbonates is recovered for recirculation in the process, and the obtained hydrogen sulfide gas is recovered as a suitable feedstock for a sulfuric acid plant or for production of elemental sulfur.

BRIEF DESCRIPTION OF THE DRAWING

The sole figure of the drawing shows a schematic flow diagram illustrating the absorption, reduction, and reformation steps of the preferred embodiment of the invention for the treatment of hot combustion gases obtained by the burning of a sulfur-containing fossil fuel in an electric generating plant.

DESCRIPTION OF THE PREFERRED EMBODIMENTS

The present invention is broadly directed to an improved method of two-stage regeneration for treating the absorbent solution obtained by absorption of sulfur oxides in a molten salt mixture containing alkali metal carbonates as reactive absorbent. The absorption stage per se is described and claimed in S.N. 638,528, which is incorporated herein by reference, and the foregoing copending application should be consulted for fuller details of the absorption stage of this process. In the absorption stage, sulfur oxides present in a hot combustion gas generally produced by burning a sulfur-containing hydrocarbon fuel are removed from the combustion gas by contacting the gas at a temperature of at least 350° C. with a molten salt mixture containing alkali metal carbonates as active absorbent to thereby remove the sulfur oxides. In a preferred aspect of practicing the absorption stage, the combustion gas is treated with a molten ternary salt mixture of the carbonates of lithium, sodium, and potassium, molten at 400° C., to convert the $SO_2$ present to alkali metal sulfite according to the following equation:

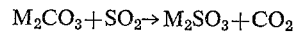

where M denotes a ternary mixture of Li, Na, K, excess $M_2CO_3$ molten salt being used as carrier solvent. Suitably, this preferred reaction is performed at a temperature between 395 and 600° C. and particularly between 400 and 450° C., approximately corresponding to the temperature of a typical power plant flue gas.

The present inventon will be particularly illustrated with respect to the removal of sulfur oxides from hot combustion gases obtained by the burning of sulfur-containing fossil fuel, particularly in electric generating plants. Referring to the drawing, a flue gas obtained from the combustion of a sulfur-containing coal at a temperature of about 425±25° C. is admitted by way of a conduit 1 to an absorber unit 2. For a typical 1000-MWE coal-fired electric utility plant utilizing coal containing 3 wt. percent sulfur, about 4,650,000 cubic ft./min. flue gas with an $SO_2$ content of about 0.18 vol. percent is generated. The flue gas is passed through a fly ash precipitator (not shown) to remove fine particles entrained therein, prior to entry into the absorber. For a 1000-MWE plant, absorber unit 2 ordinarily consists of five stainless steel cyclone spray towers in parallel arrangement. These towers are suitably insulated with about 5 inches of high temperature insulation so that the temperature drop within them is less than five degree centigrade.

The flue gas enters tangentially at the base of absorber 2 and travels upwardly with a velocity of about 20 ft./sec. It is contacted countercurrently by a spray of molten carbonate (M.P. about 400° C.) which is discharged through a spray distributor 3 located about 15 ft. above the base of the absorber tower. The molten carbonate salt is contained in a storage vessel 4, which is suitably insulated and equipped with heaters so as to maintain the carbonate salt in a molten state. The molten salt leaves vessel 4 by way of a conduit 5 connected to spray distributor 3 at a flow rate adjusted to provide about 10–30 mole percent sulfite content in the effluent molten salt stream leaving the bottom of absorber 2 by way of a conduit 6.

Because of the rapidity of the chemical reaction between the molten carbonate and the gaseous sulfur dioxide to form alkali metal sulfite, a gas residence time of less than a second is sufficient for a spray height of 15 feet. In addition to the chemical reaction requirements, the flow rate of the flue gas is also determined by the need for minimizing entrainment and pressure drop in the absorber as well as by the spray distribution pattern of the molten carbonate. Any of various well-known contact methods and equipment may be used to insure rapid reaction between the gaseous sulfur dioxide and the molten liquid carbonate such as use of wet-wall contactors or packed columns or absorbers containing perforated plates or bubble-cap trays. However, the spray technique is generally preferred because of its relative simplicity and efficiency.

After contacting the molten carbonate spray, the desulfurized flue gas flows past distributor 3 into a wire demister 7, which is about one foot thick and located in the upper section of the absorber tower about two feet above the distributor. The demister serves to remove entrained salt-containing droplets from the flue gas, which is then passed through a conical transition section 8 to minimize pressure drops in the absorber tower and then through a plurality of heat exchangers 9, from which it emerges at a temperature of about 150° C. Heat exchangers 9 may serve as preheaters for the water and the air used in the generating plant. The cooled flue gas from heat exchangers 9 is discharged to the atmosphere through a power plant stack 10. Conventional power plant stacks are 400 to 800 feet high so that mixing in the atmosphere will considerably reduce the ground level concentration of the sulfur dioxide ordinarily present in the emitted stack gases. Since the present process is capable of eliminating 99.9 vol. percent of the sulfur dioxide content of the flue gas, the resultant ground level concentration of sulfur dioxide under ideal conditions is virtually nonexistent, i.e., less than one part per billion.

The molten mixture of alkali metal carbonates in vessel 4 serves as the active absorbent. Where the melt consists essentially of only the alkali metal carbonates, a ternary mixture consisting of potassium carbonate, lithium carbonate, and sodium carbonate is utilized having a melting point between 400 and 600° C. A mixture containing approximately equal amounts by weight of the carbonates of potassium, lithium, and sodium has a melting point of about 395° C., about that of the eutectic composition. Since the low melting region around the eutectic temperature is quite broad, a relatively large variation in composition ($\pm 5$ mole percent) does not change the melting point markedly. Thus, a suitable ternary eutectic composition range, in mole percent, consists of $45 \pm 5$ lithium carbonate, $30 \pm 5$ sodium carbonate, and $25 \pm 5$ potassium carbonate.

Data for the free energy of reaction between $SO_2$ and $M_2CO_3$ to form $M_2SO_3$ show that thermodynamically this reaction is favored at lower temperatures. Therefore, the absorption of $SO_2$ is preferably carried out at temperatures as close to the melting point of the mixed carbonate eutectic as is feasible from plant operating considerations. Further, in order to minimize equipment corrosion and economize on fuel costs, it is additionally preferred to utilize a molten carbonate-containing mixture having as low a melting point as feasible.

Other nonreactive molten salts may be combined with the alkali metal carbonates to serve as inexpensive diluents or to lower the temperature. For example, a lithium-potassium salt mixture containing chloride, sulfite, and carbonate is molten at a temperature of 325° C. Where such diluent salts are utilized, either a single alkali metal carbonate or a binary or ternary mixture of the alkali metal carbonates is combined therewith, the final mixture containing two or more alkali metal cations. In such a system as little as 2 mole percent of alkali metal carbonate may be present with the remaining 98 mole percent being an inert diluent carrier, although at least 5–10 mole percent of alkali metal carbonate is preferable. Illustrative of such a suitable mixture is one utilizing an LiCl-KCl eutectic (M.P. 358° C.) wherein the starting salt ratio consists of 64.8 mole percent LiCl and 35.2 mole percent KCl. An absorbent molten mixture containing 90 mole percent of the LiCl-KCl eutectic and 10 mole percent of a corresponding molar ratio of potassium and lithium carbonates has a melting point of about 375° C. Suitable chloride-carbonate molten salt mixtures contain, in mole percent, 15–60 $K^+$, 40–85 $Li^+$, and 0–20 $Na^+$ as cations and 10–98 $Cl^-$ and 2–90 $CO_3^=$ as anions.

Although the melting points of the pure alkali metal sulfites and sulfides are considerably higher than those of the mixed alkali metal carbonates, if a sulfite or sulfide is substituted for only a portion of the carbonate the melting point is lowered, thereby making feasible the circulation of sulfite-containing carbonate melt without the need for additional heat input to keep the circulated salt molten, which would be required were sulfite obtained alone as the reaction product. An alkali metal sulfite content of 10–30 mole percent of the molten salt is preferred.

The molten sulfite-containing carbonate resulting from the rapid reaction between the molten carbonate spray and the flue gas is collected in a dished-bottom heated sump 11 of absorber 2. About a 70 mole percent excess of unreacted carbonate is maintained to serve as a solvent for the sulfite formed by the reaction. The sulfite-carbonate mixture is pumped from sump 11 of absorber 2 through conduit 6 by way of a pump 12, then through a conduit 13 to a heat exchanger 14. The sulfite-carbonate mixture entering heat exchanger 14 is at a temperature of about $425 \pm 25°$ C. The mixture leaves heat exchanger 14, increased in temperature, by way of a conduit 15 and passes through a heater 16, which is optionally utilized for further increasing the temperature of the mixture, where required, to about $625 \pm 25°$ C. The mixture leaves heater 16 through a conduit 17 where it is fed into a spray distributor 18 in a reducer unit 19. Other gas-liquid contact techniques, similar to those usable for absorber unit 2, may also be used for the two-stage regeneration reaction.

The two-stage regeneration process of the present invention requires additional equipment compared with the single-stage regeneration process disclosed in S.N. 638,528. However, for certain feedstock and equipment conditions and requirements, the present two-stage regeneration process is advantageous compared with the single-stage regeneration process in providing greater overall single cycle product conversion and yields and in permitting optimization of each of the reduction and reformation steps of the two-stage regeneration process. Thus, the optimum reaction parameters, particularly temperature, pressure and contact time, are different for the reduction and reformation steps because of thermodynamic and kinetic considerations. If it is assumed that the reaction mechanism of the single regenration stage is a combination of the reduction and reformation steps, then a compromise may be required as to the overall reaction conditions selected for single-stage regeneration. Also, by separating the two steps, the desired individual reactions may not only be optimized, but also unwanted side reactions may be minimized, both by selection of equipment and reaction conditions favoring the desired reaction and by the ability to separately remove the formed products from the reduction reaction vessel, thereby resulting in a more overall complete reaction.

The chemical reaction in reducer unit 19 involves reduction of the alkali metal sulfite to alkali metal sulfide by treatment of the alkali metal sulfite-carbonate melt under reducing conditions with a gaseous mixture containing as active reducing agent hydrogen, carbon monoxide, or a mixture thereof in accordance with the following equations:

$$M_2SO_3 + 3H_2 \rightarrow M_2S + 3H_2O$$

$$M_2SO_3 + 3CO \rightarrow M_2S + 3CO_2$$

$$2M_2SO_3 + 3H_2 + 3CO \rightarrow 2M_2S + 3CO_2 + 3H_2O$$

Depending in part upon the particular reductant gas selected, the reaction parameters including relative proportions of feed stock and reductant gas, temperature, pressure, and gas-liquid contact conditions, are selected so as to favor the foregoing principal reactions and minimize the effects of competing side reactions. Higher temperatures, preferably between 600 and 650° C., favor the principal reactions.

Any convenient source of hydrogen or carbon monoxide may be utilized. Where a reductant mixture of both hydrogen and carbon monoxide is used, this may be obtained by mixing the two pure gases in desired proportions, or the gaseous mixture may be prepared in situ in the regenerator by feeding in a mixture of hydrogen and carbon dioxide, the carbon dioxide then being reduced to carbon monoxide by reaction with hydrogen. Or steam and carbon monoxide may be used as a reductant gas mixture, reaction between a portion of the steam and carbon monoxide resulting in production of hydrogen and carbon dioxide. However, from the point of view of process economics, the gaseous mixture of hydrogen and carbon monoxide utilized is ordinarily obtained from a synthesis gas plant as a water gas, producer gas, coal gas, or carburetted water gas. A representative water gas or blue gas obtained by the decomposition of steam in the presence of an incandescent carbon source, such as bituminous coal or coke, typically contans 40% CO, 48% $H_2$, 5% $CO_2$, 6% $N_2$, and 1% $CH_4$, by volume. A representative producer gas obtained by the partial combustion of a carbonaceous fuel in air contains 25–35% CO, 10–15% $H_2$, 3–7% $CO_2$, balance $N_2$, by volume, Preferably, the water gas or producer gas utilized is provided by a synthesis gas plant adjunct capable of delivering ash-free gas for the reducer unit.

Referring to the drawing, a reductant gas mixture containing hydrogen and carbon monoxide provided by a synthesis gas plant 20 enters the base of reducer 19 by way of a conduit 21. The molten sulfite-carbonate mixture sprayed from distributor 18 reacts with the reductant gas, the sulfite being reduced to sulfide. The molten alkali metal sulfide-carbonate is collected in a sump 22 at the base of reducer 19. The sulfide-carbonate mixture is pumped from sump 22 through a conduit 23 by way of a pump 24, then through a conduit 25 to a heat exchanger 26, where it loses heat. The molten mixture is then fed through a conduit 27 into a spray distributor 28 in a reformer or regenerator unit 29. Heat exchangers 14 and 26 are ordinarily part of the same heat exchanging unit, but have been shown as separate units in the schematic diagram for clarity of illustration.

The gas mixture produced in the reduction reaction with synthesis gas consists principally of carbon dioxide and steam in accordance with the previously shown equation, and will also contain minor amounts of other gaseous components as well as excess unreacted amounts of reducing gas. The relative proportions of carbon dioxide and steam present will depend upon the relative porportions of hydrogen and carbon monoxide utilized in the reductant gas, excess hydrogen favoring the production of steam, excess carbon monoxide favoring the production of carbon dioxide. The resultant gas mixture passes through a demister 30, which removes entrained liquid particles therefrom, the gas then leaving reducer 19 by way of a conduit 31. Any carbon dioxide and steam in excess of that utilized in the subsequent reformation step are vented to the atmosphere by way of a conduit 32, suitably valved, and join the stream of desulfurized flue gas leaving absorber 2 just prior to entry into heat exchangers 9. Where the gas mixture leaving reducer unit 19 by way of conduit 31 contains substantial amounts of unreacted hydrogen and carbon monoxide, along with formed carbon dioxide and steam, the mixture may be returned to reducer 19 for recycle in the reduction step by way of valved conduits 33 and 34.

For the reformation or regeneration step, at least a portion of the regenerant gas mixture of carbon dioxide and steam leaving reducer 19 by way of conduit 31 is fed by way of valved conduits 33 and 35 through a cooler 36 and enters the base of regenerator unit 29 by way of a conduit 37 at a reduced temperature of 425±25° C. Where desired, selected additional amounts of carbon dioxide or steam may also be fed to regenerator unit 29. The reformation reaction is favored at lower temperatures, below 450° C., at which the sulfide-containing melt is molten. Where only sulfide and carbonate is present in the melt, a temperature range of 395–450° C., is suitable, a range of 400–425° C., being preferred. With other salt diluents present that lower the melting point, a temperature range of 325–450° C., is suitable, a range of 375–425° C., being preferred. The molten sulfide-carbonate mixture sprayed from distributor 28 reacts with the regenerant gas mixture. Molten alkali metal carbonate, including both regenerated and carrier carbonate, is collected in a sump 38 at the base of regenerator 29, from where it is fed by way of a conduit 39 by means of a pump 40 through a conduit 41 to storage vessel 4. The reconverted carbonate is then recycled to absorber unit 2 by way of conduit 5.

The hydrogen sulfide-rich gas mixture produced in the regeneration reaction also may contain minor amounts of COS, S, $CO_2$ and $H_2O$. This gas mixture passes through a demister 42, which removes entrained liquid particles, and leaves regenerator 29 by way of a conduit 43 where it is fed to a processing plant 44, schematically shown as a hydrogen sulfide storage vessel.

To obtain sulfuric acid, the hydrogen sulfide-rich gas is oxidized to $SO_2$, which is then catalytically converted to $SO_3$ by a chamber process or contact process, the $SO_3$ being then absorbed in 98–99 wt. percent sulfuric acid alternatively, the $H_2S$-rich mixture is fed to a reactor for conversion to elemental sulfur. The hydrogen sulfide feedstock provided by the present process is ideally suitable for conversion to sulfuric acid or to sulfur on an industrial scale by the foregoing well-known techniques. The selection of the final product, i.e., sulfuric acid or sulfur, will be determined generally by economic and marketing considerations.

The following examples illustrate the practice of the invention but are not intended to unduly limit its generally broad scope.

Example 1.—Reduction of alkali metal sulfite using hydrogen or carbon monoxide

An alkali metal sulfite-carbonate melt was prepared by bubbling $SO_2$ gas through a ternary alkali metal carbonate melt of eutectic composition at a temperature of 450° C. The melt contained 22.8 weight percent $M_2SO_3$ and 75.0 weight percent $M_2CO_3$, where M denotes a ternary mixture of Li. Na, K.

Hydrogen gas was bubbled through the molten sulfite feedstock at a temperature of 450° C. and at atmospheric pressure. The concentration of sulfite in the melt was reduced from 22.8 to 3.5%.

The reduction was continued by bubbling carbon monoxide through the melt at atmospheric pressure at 450° C. The sulfite content of the melt was further reduced to 0.2 wt. percent. However, for both the hydrogen and carbon monoxide an undesired increase in sulfate concentration occurred in the melt because competing side reactions were not controlled in these runs.

Example 2.—Pressurized reduction batch runs

Using a synthetic "standard" feedstock containing 14.1 wt. percent ternary alkali metal sulfite and the balance alkali metal carbonate, a series of batch runs was performed in closed containers with the reducing gas at pressures up to 400 p.s.i.g. the entire apparatus being rocked to provide for more efficient liquid-gas contact during the tests. The results obtained in typical runs are shown in the table below.

TABLE.—CLOSED SYSTEM REDUCTION OF SULFITE TO SULFIDE IN ALKALI METAL CARBONATE MELTS

| Reducing gas | Pressure (p.s.i.g.) | Temperature, °C. | Time (hr.) | Percent completion |
|---|---|---|---|---|
| $H_2$ | 325 | 650 | 16 | 21 |
| $H_2$ | 225 | 500 | 14 | 35 |
| $H_2$ | 275 | 450 | 4 | 21 |
| $H_2$ | 225 | 250 | 62 | 38 |
| CO | 400 | 680 | 14 | 67 |
| CO | 150 | 680 | 2 | 25 |
| CO | 140 | 680 | 16 | 70 |
| CO | 210 | 600 | 4 | 44 |
| CO | 190 | 600 | 19 | 48 |
| CO | 125 | 400 | 14 | 41 |

Example 3.—Pressurized reduction flow runs using hydrogen

Using the synthetic standard sulfite feedstock, a series of continuous flow runs was made with hydrogen as the reducing gas. The melt temperature used was 650° C. The gas was bubbled through the melt under 10, 80, and 600 p.s.i.g. of reducing gas pressure. The flow rate of hydrogen was 250 cc./min. Before introducing hydrogen into the system, it was first purged with argon to remove any extraneous water. After two hours at 650° C., 60% of the sulfite was reduced under test conditions, the percentage conversion increasing to 85% at the end of 4 hours, and being substantially complete at the end of 8 hours. At the lower temperature of 450° C., poor reduction occurred at the end of two hours, only 2%, the percentage conversion increasing to about 50% at the end of 20 hours.

Example 4.—Pressurized reduction flow runs using carbon monoxide

Using the "standard" sulfite feedstock of Example 2, a continuous flow reduction with CO was studied at a temperature of 610° C. for pressures of 15 and 80 p.s.i.g. at a CO flow rate of 20 cc./min. In other studies the flow rate was increased to 100 cc./min. It was found that an increase in both pressure and flow rate definitely increased the rate of reduction. At 80 p.s.i. and 610° C., the reaction was about 20% complete in one hour, 30–40% complete in two hours, and complete in about 12 hours. At 450° C. the reaction proceeded more slowly, the reduction rate being slightly greater at 80 p.s.i. than at 10 p.s.i. In all runs it was found that the initial sulfite content of the melt of 14.1 wt. percent had been decreased to a final concentration within a range of about 6% to less than 0.01 wt. percent. The melt analyses also showed a corresponding increase in content of formed sulfide, with very little sulfite being noted after reduction had gone to completion.

Example 5.—Hydrogenation catalysts

Various hydrogenation catalysts were evaluated to determine whether these would increase the rate of the reduction reaction. It was found that the cobalt molybdate catalysts were effective at a temperature of 600–650° C. in maintaining the initial high rate of reaction until the reaction was at least 85% complete, thereby increasing the overall rate of the reduction reaction. However, these catalysts may require modification because of their solubility in the molten carbonate melt in the form used.

Example 6.—Reformation of alkali metal carbonate

A synthetic mixture was prepared consisting of lithium carbonate, sodium carbonate, potassium carbonate, and sodium sulfide, these salts being mixed in suitable proportions (43 wt. percent carbonate ion) so that upon regeneration there would be present the proper ratio of cations corresponding to the eutectic composition. These mixed salts were placed in a reaction vessel and heated. Carbon dioxide was saturated with water by bubbling through water at 80° C. and heated to prevent the condensation of water in the lines. Flow of the gas mixture was started when the salt reached a temperature of 300° C. In about 30 minutes, even before all the salt had melted, about 85 wt. percent of the sulfide had been converted to hydrogen sulfide gas, which was removed from the off-gas. Analysis of the melt confirmed that 75–95% of the sulfide was removed, and that the carbonate ion content had increased from the original 43% to about 60% by weight, corresponding to the composition of the alkali metal carbonate eutectic.

Example 7.—Sequential reduction and reformation

A stainless steel packed column was used, the vessel containing crushed nonporous alumina with less than 1% impurities as packing material. The vessel was placed in a rocking furnace so the molten salt could be dispersed over the alumina surface after melting of the salt. Provision was made to reverse the gas inlet-outlet flow system upon inversion of the furnace. In this manner countercurrent flow of gas and melt was always obtained, with the gas inlet always at the bottom of the reactor. The column was charged with a mixture of sodium carbonate, lithium carbonate, potassium carbonate, and sodium sulfite in desired proportions so that the alkali metal carbonate eutectic would be formed upon complete regeneration. After heating to 625° C., purging with helium to expel adsorbed water and gases, and rocking to disperse the melt on the alumina packing, hydrogen was passed through the reaction vessel at 100 p.s.i.g. to reduce the sulfite to sulfide. The progress of the reduction reaction was followed by measuring the evolved water, which was trapped and periodically weighed. After the reduction was 90% complete, the flow of hydrogen was stopped. For the reformation step, carbon dioxide, which had been saturated with water at 90° C., was passed through the reaction vessel containing the formed alkali metal sulfide dissolved in carbonate at a temperature of 400° C. Evolved hydrogen sulfide was removed from the off-gas by scrubbing it with acidified aqueous cadmium nitrate solution.

Example 8.—Cyclic runs

The three sequential steps of absorption, reduction, and reformation were repeated for two complete cycles in a stainless steel packed column as used in Example 7 obtaining the removal of sulfur dioxide from a simulated flue gas and the regeneration of the alkali metal carbonate absorbent.

Various mixtures of sulfur dioxide-carbon dioxide were passed through the reaction chamber at 450° C. for several hours while the feed gas and off gas were monitored periodically. The sulfur dioxide concentration in the feed gas was varied from 0.1% to 1% and up to 100% three times during the first absorption step. Sulfur dioxide was essentially removed completely, the only time it being detectable in the off gas in trace quantities of less than 1 p.p.m. was when it constituted 100 percent of the feed gas.

For the first cycle the absorption step was carried out at 425–450° C. until the melt contained about 15 mole percent alkali metal sulfite. The reduction step was carried out at 575° C. and was 70% complete in 5 hours. The reformation step was carried out at 450° C. and was about 32% complete in 1.5 hours and 45% complete in 7 hours.

For the second cycle, the melt was recharged by reaction with $SO_2$-$CO_2$ gas to about 35 mole percent alkali metal sulfite (with about 4 mole percent M₂S present from the first cycle) at 425–450° C. The reduction step was carried out at 475° S. and was 50% complete in 22 hours. The reformation or regeneration step was performed at 425° C. and was about 40% complete in 1.5 hours.

At the conclusion of the test, alkali metal sulfide was found in the melt. This test demonstrated that the alkali metal molten salt could be readily cycled through the steps of absorption, reduction, and reformation for the complete process.

It will, of course, be realized that many variations in reaction conditions may be used in the practice of this invention, depending in part upon the particular sulfur oxide content of the flue gas to be desulfurized, as well as the hydrocarbon or fossile fuel serving as the source of combustion gas. The term "hydrocarbon or fossil fuel" broadly includes carbonaceous fuels such as coal, oil-shale, petroleum products, natural gas, and associated waste products such as acid sludges and tars.

While certain exemplary reactions have been described for the absorption and regeneration steps, it has been found, particularly with respect to the regeneration stage, that the actual mechanism of reaction is a highly complex one and several competing reactions may occur simultaneously. Therefore, to optimize each of the absorption and regeneration stages, varying reaction temperatures and pressure may be employed, as well as the use of catalysts and means for providing greater surface contact between the reductant and regenerant gases and the melts. Also, there may be employed a batch process or a continuous process, preferably the latter, with the usual provision for recycle of various unreacted or partially reacted components. For example, the reformation step may even be performed with a solidified sulfide-carbonate salt at a temperature as low as 100° C. Further, even where the desired reactions do not go to completion and products are also present produced by completing or undesired side reactions, the unreacted or undesired products may be recycled in the process without substantial interference with the basic absorption and regeneration stages. Thus, while the examples illustrating this invention have been described with respect to specific concentrations, times, temperatures, and other reaction conditions, the invention may be otherwise practiced, as will be readily apparent to those skilled in this art. Accordingly, this invention is not to be limited by the illustrative and specific embodiments thereof, but its scope should be determined in accordance with the claims thereof.

I claim:
1. In a process including absorption and regeneration stages for removing sulfur dioxide from hot combustion gas produced by burning a sulfur-containing hydrocarbon fuel where in the absorption stage the sulfur dioxide-containing combustion gas is contacted at a temperature of at least 350° C. with an initial molten salt mixture containing alkali metal carbonates as active absorbent for said sulfur dioxide to convert it to the sulfites of said alkali metals, and where in the regeneration stage the alkali metal sulfites are treated to form hydrogen sulfide gas as a recoverable product and regenerate the alkali metal carbonates for recirculation in the process, in combination with the absorption stage the improvement in the regeneration stage which comprises in a first step of reduction, reacting at a temperature of at least 400° C. the sulfite-containing molten salt obtained from said absorption stage with a reductant gas mixture containing as principal active reducing agent a gas selected from the class consisting of hydrogen, carbon monoxide, and a hydrogen-carbon monoxide mixture to form alkali metal sulfide in the molten salt and a resultant gaseous mixture containing steam, carbon dioxide, or steam-carbon dioxide corresponding respectively to said selected gas used as reducing agent, separately recovering the sulfide-containing molten salt and said resultant gaseous mixture, and in a second step of reformation, reacting said alkali metal sulfide-containing salt with a gaseous mixture containing carbon dioxide and steam to form hydrogen sulfide gas as a recoverable product and at the same time regenerate the alkali metal carbonates for recirculation in the process.

2. The process according to claim 1, wherein the reaction in the reformation step is performed at a temperature below 450° C. at which the alkali metal-containing salt is molten.

3. The process according to claim 2, wherein the alkali metal sulfite content of the resultant molten salt from the absorption stage contains about 10–30 mole percent alkali metal sulfite, the reduction step is performed at a temperature between 400 and 700° C. and the reformation step is performed at a temperature between 325 and 450° C.

4. The process according to claim 3, wherein said reduction step is performed at a temperature between 600 and 650° C. and the reformation step is performed at a temperature between 375 and 425° C.

5. The process according to claim 1, wherein said active reducing gas consists principally of hydrogen.

6. The process according to claim 1, wherein said active reducing gas consists principally of carbon monoxide.

7. The process according to claim 1, wherein said active reducing gas consists principally of a mixture of hydrogen and carbon monoxide.

8. The process according to claim 1 wherein the reformation step, at least a portion of the resultant gaseous mixture obtained from the reduction step is utilized to provide said gaseous mixture containing carbon dioxide and steam.

References Cited

UNITED STATES PATENTS

| 2,177,707 | 10/1939 | Gaither | 23—225 |
| 3,133,789 | 5/1964 | Guerrieri | 23—63 |
| 3,236,589 | 2/1966 | Reinhall et al. | 23—48 |
| 3,337,294 | 2/1963 | Ono et al. | 23—63 |

OSCAR R. VERTIZ, *Primary Examiner.*

G. O. PETERS, *Assistant Examiner.*

U.S. Cl. X.R.

23—134